Patented June 19, 1928.

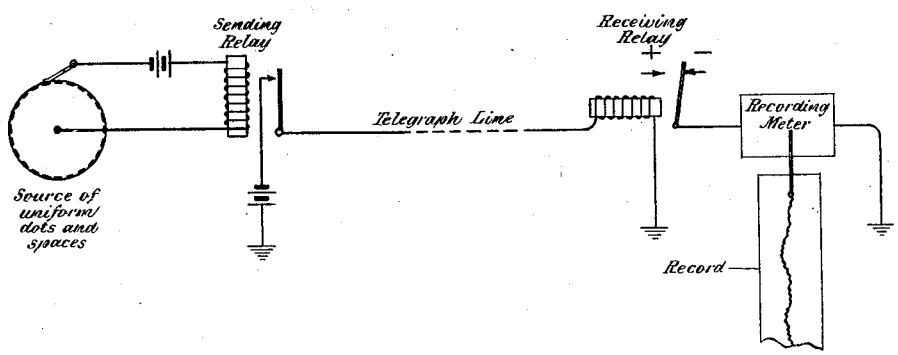

1,673,829

UNITED STATES PATENT OFFICE.

MACLEAN KIRKWOOD, OF TOWACO, NEW JERSEY, ASSIGNOR TO AMERICAN TELEPHONE AND TELEGRAPH COMPANY, A CORPORATION OF NEW YORK.

TESTING OF TELEGRAPH CIRCUITS.

Application filed July 9, 1926. Serial No. 121,438.

This invention relates to the testing of telegraph circuits, and more particularly to the testing of printing telegraph circuits to determine their stability, that is, the period of time during which they will operate satisfactorily without the necessity of withdrawing them from service for readjustment.

The object of my invention is the simple and ready determination of the stability of a given telegraph circuit used for printer service.

The signals passing over a printing telegraph circuit are affected by fortuitous distortion and systematic distortion. Systematic distortion may be divided into characteristic distortion and bias, which is the durational excess of the marking impulses over the spacing impulses, or vice versa. In properly operated carrier systems the fortuitous distortion is normally limited to that caused by "static"; in metallic telegraph systems it is normally limited to the distortion caused by duplex unbalance. In grounded systems the sources of fortuitous distortion, except the distortion due to duplex unbalance, are exterior to the system. The characteristic distortion is normally a function of the system used, the length of the circuit, the apparatus in the circuit, etc.; in brief, it is a function of the "lay-out" of the circuit. Tests indicate that the characteristic distortion of a circuit does not undergo material change over a considerable period of time. Hence it appears that a reasonable measure of the stability of a telegraph circuit used for printer service can be made if a suitable method is provided for recording over an extended period of time the regularly recurring signals produced at the receiving end of the circuit.

Accordingly, I use reversals, that is, a uniform succession of dots and spaces, transmit these signals to the receiving end of the circuit over a considerable period of time, and cause to be recorded at the receiving end an averaged reading of the bias in the received signals.

My method of testing the stability, and the apparatus desirable in effecting the test, will be understood from the following description when this description is read with reference to the accompanying drawing, which shows diagrammatically the essential elements of the system, including the apparatus employed for testing.

I first "line up" the circuit to be used in service, that is, I adjust it so that it is free from bias in the received signals. To accomplish this first step in my method I use a uniform succession of dots and spaces, commonly known as reversals, transmitted at the same signal frequency that is used in service.

With this adjustment completed, I connect the source of reversals to the sending end of the circuit and continue over an extended period of time the transmission of the dots and spaces. The source of reversals and a battery are connected in series with the winding of the sending relay which alternately connects the telegraph line to ground through a battery and disconnects the same.

At the receiving end, the receiving relay connects positive and negative battery alternately to the local circuit, to produce the marking and spacing signals, the operation and release of the relay being in response to the operation and release of the relay at the sending end. Between the receiving relay and the ground I connect a recording meter, which may be a recording voltmeter or a recording milliammeter, as is required by the type of local circuit. The recording meter is associated with a record strip with central zero, this recording apparatus being so adjusted that the device tends to some extent to follow the individual received pulses and produces an averaged reading indicating, in the case of marking bias, the amount by which, on the average, the marking impulses exceed in duration the spacing impulses. The record strip is preferably marked to show on one side of zero, "Percentage marking bias", and on the other side of zero, "Percentage spacing bias". The recording meter, in order to function as indicated above, should be one having a relatively slow natural period.

By using reversals for the transmitted signals and recording an averaged reading of the received signals, as described above, I obtain a record of the bias in the received signals, and as stated above, this record of the bias, taken over an extended period of time, gives a graphic indication of the stability of the circuit in service. In addition to the bias, there will be indicated any serious fortuitous distortion.

It is to be understood that while the drawing shows the essential elements of an extremely simple printing telegraph system, my invention is applicable to circuits of any degree of complexity having any number of telegraph repeaters.

What is claimed is:

1. The method of testing the stability of a telegraph circuit, which consists in adjusting the circuit so that it is temporarily free from bias in the received signals, transmitting over the circuit under service conditions a regular and continued succession of signals, and causing the received signals to produce a graphic indication over an extended period of time of the bias in said signals.

2. The method of checking the stability of a telegraph circuit, which consists in adjusting the circuit so that it is temporarily free from bias in the received signals, transmitting over the circuit under service conditions a continued succession of uniform marks and spaces, and causing the received signals to produce a graphic indication over an extended period of time of the bias in said signals.

3. The method of testing the stability of a telegraph circuit, which consists in adjusting the circuit so that it is temporarily free from bias with respect to the duration of the marking and spacing impulses produced at the receiving end, transmitting over the circuit under service conditions a regular and continued succession of signal impulses, causing said succession of impulses to set up at the receiving end marking and spacing impulses, and causing to be produced in response thereto a graphic averaged record over an extended period of time of the durational relation of the marking and spacing impulses.

4. In association with a telegraph circuit and as means for testing the stability thereof, the combination of means at one end of the circuit for transmitting thereover a regular and continued succession of signals, means at the other end of the circuit for setting up marking and spacing impulses in response to the received signals, and responsive means associated therewith for producing a graphic averaged record over an extended period of time of the durational relation of the marking and spacing impulses.

5. In association with a telegraph circuit and as means for checking the stability thereof, the combination of means at one end of the circuit for transmitting reversals thereover, means at the other end of the circuit for setting up marking and spacing impulses in response to the reversals, and responsive means associated therewith for producing a graphic average record over an extended period of time of the durational relation of the marking and spacing impulses.

In testimony whereof, I have signed my name to this specification this 8th day of July, 1926.

MACLEAN KIRKWOOD.